(12) United States Patent
Rofougaran

(10) Patent No.: US 7,738,840 B2
(45) Date of Patent: Jun. 15, 2010

(54) VOICE, DATA AND RF INTEGRATED CIRCUIT WITH ON-CHIP TRANSMIT/RECEIVE SWITCH AND METHODS FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 674 days.

(21) Appl. No.: 11/703,995

(22) Filed: Feb. 8, 2007

(65) Prior Publication Data

US 2008/0194212 A1     Aug. 14, 2008

(51) Int. Cl.
*H04B 1/44*     (2006.01)
(52) U.S. Cl. .......................................... 455/78; 455/83
(58) Field of Classification Search .................. 455/78, 455/83, 19, 82, 562.1, 575.7, 127.4
See application file for complete search history.

(56) References Cited

U.S. PATENT DOCUMENTS

| | | | | |
|---|---|---|---|---|
| 6,686,885 B1 * | 2/2004 | Barkdoll et al. | ....... | 343/700 MS |
| 6,804,497 B2 * | 10/2004 | Kerth et al. | ................. | 455/88 |

* cited by examiner

*Primary Examiner*—Eugene Yun
(74) *Attorney, Agent, or Firm*—Garlick Harrison & Markison; Bruce E. Stuckman

(57) ABSTRACT

A voice, data and RF integrated circuit (IC) includes an RF transmitter that generates a transmit signal from outbound data. An RF receiver that generates inbound data from a received signal. A processing module generates a control signal to select either a receive mode or a transmit mode for the RF transmitter and the RF receiver, the control signal having a first value when the receive mode is selected and a second value when the transmit mode is selected. A transmit/receive switch couples the transmit signal to an antenna when the control signal has a second value, and produces the received signal based on an inbound RF signal to the antenna when the control signal has a first value, wherein the transmit/receive switch includes an on-chip microelectromechanical switch.

9 Claims, 8 Drawing Sheets

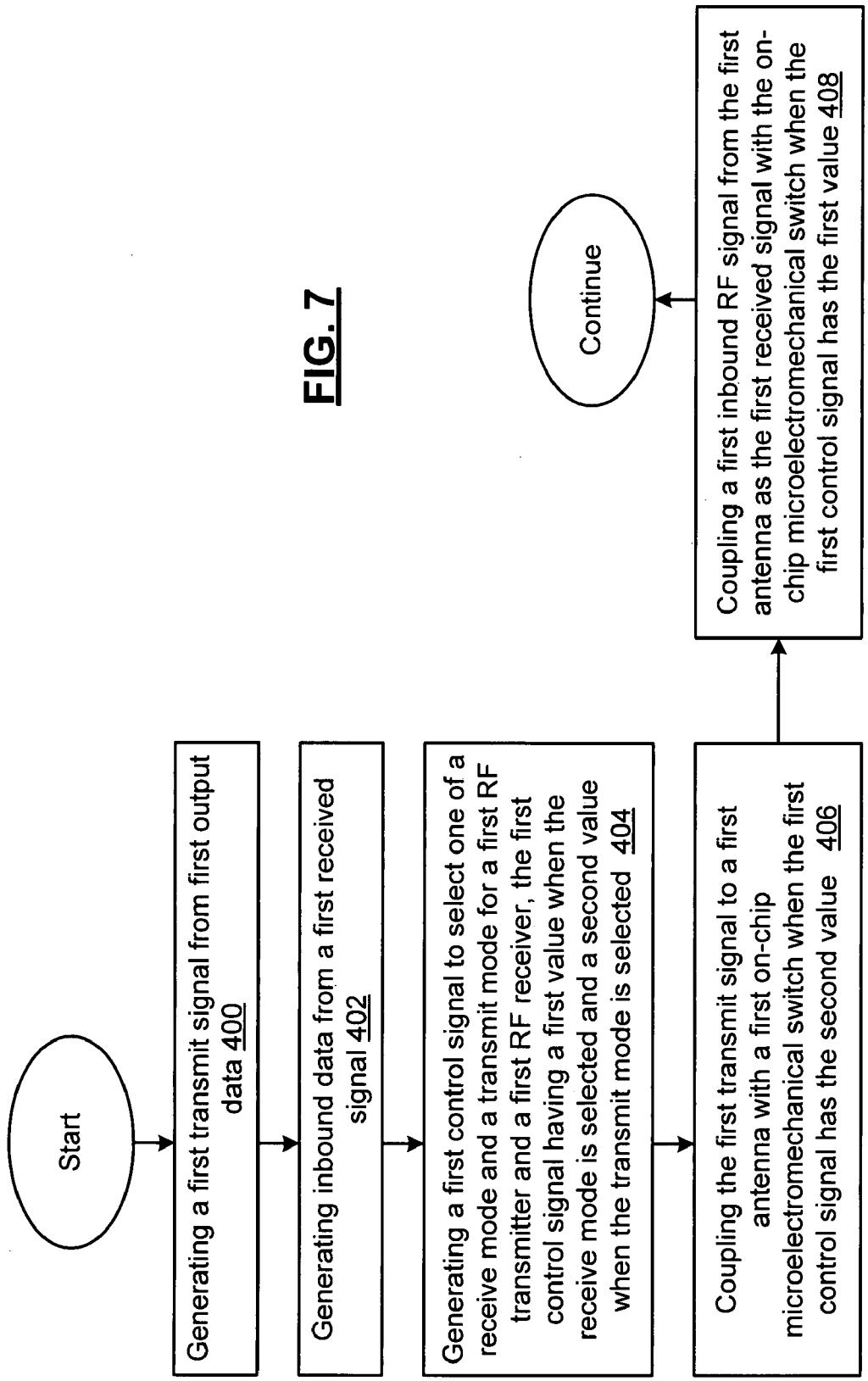

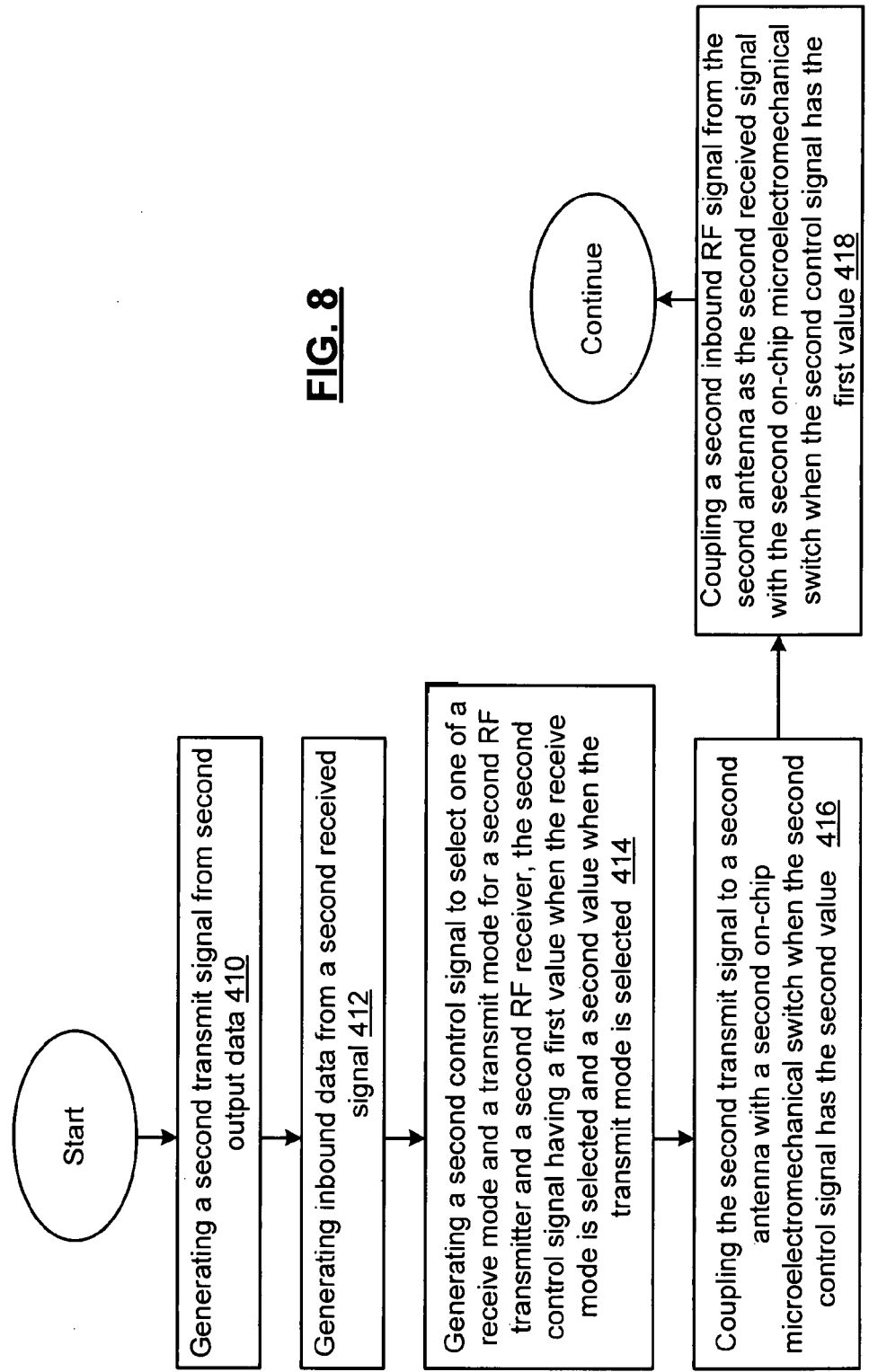

VOICE, DATA AND RF INTEGRATED CIRCUIT WITH ON-CHIP TRANSMIT/RECEIVE SWITCH AND METHODS FOR USE THEREWITH

CROSS-REFERENCE TO RELATED APPLICATIONS

None

BACKGROUND OF THE INVENTION

1. Technical Field of the Invention

This invention relates generally to wireless communications systems and more particularly to radio transceivers used within such wireless communication systems.

2. Description of Related Art

Communication systems are known to support wireless and wire line communications between wireless and/or wire line communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna through an antenna interface and includes a low noise amplifier, one or more intermediate frequency stages, a filtering stage, and a data recovery stage. The low noise amplifier (LNA) receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Many wireless communication systems include receivers and transmitters that share a common antenna. In some implementations a transmit/receive switch is used to alternatively couple the antenna to the transmitter and to the receiver. If high transmit powers are used, the transmit/receive switch must be capable of carrying fairly high currents. Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 7 is a flowchart representation of a method in accordance with an embodiment of the present invention.

FIG. 8 is a flowchart representation of a method in accordance with an embodiment of the present invention.

DETAILED DESCRIPTION OF THE INVENTION

Figure 1:
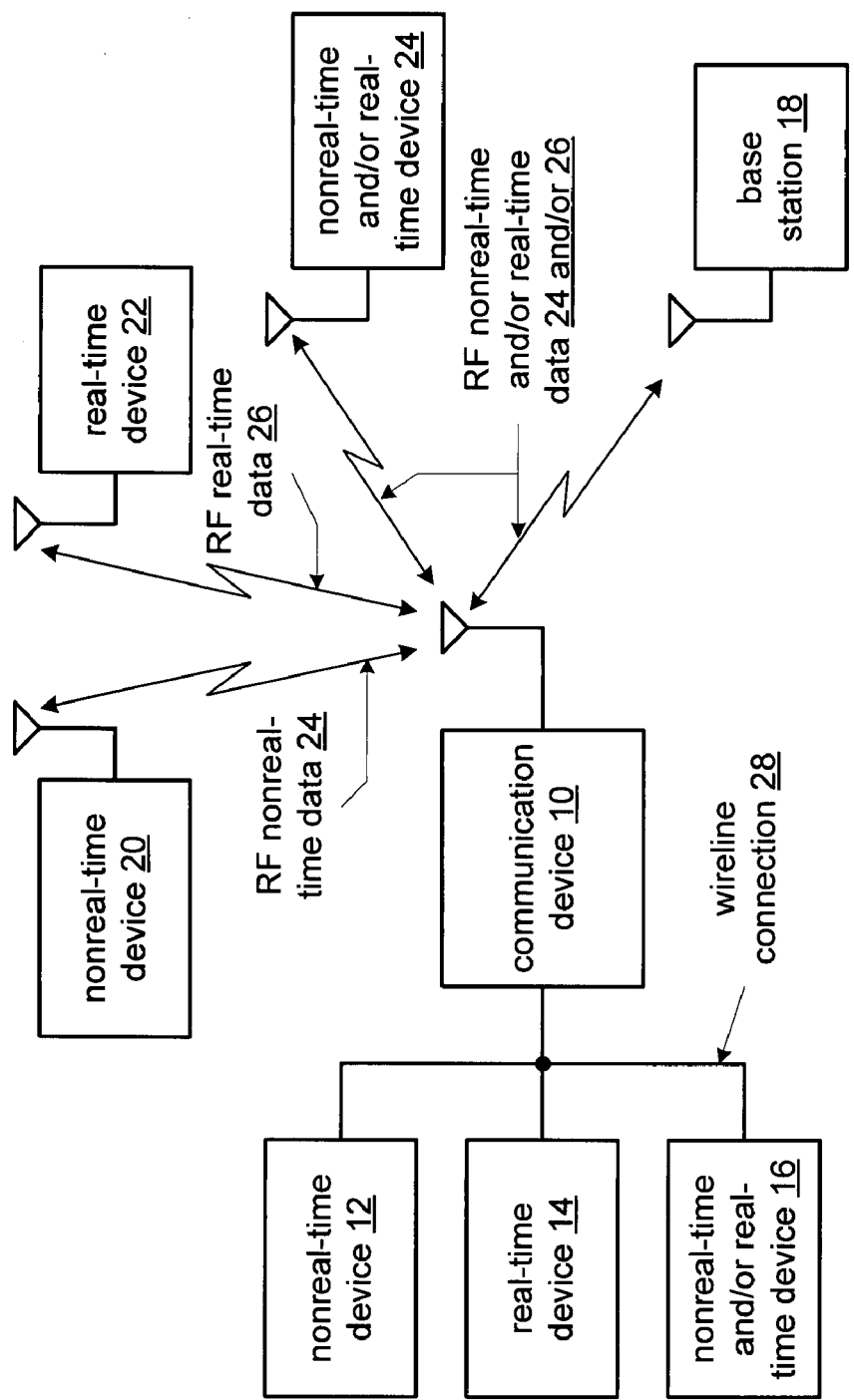
FIG. 1 is a schematic block diagram of a wireless communication system in accordance with the present invention.

FIG. 1 is a schematic block diagram of an embodiment of a communication system in accordance with the present invention. In particular a communication system is shown that includes a communication device 10 that communicates real-time data 24 and/or non-real-time data 26 wirelessly with one or more other devices such as base station 18, non-real-time device 20, real-time device 22, and non-real-time and/or real-time device 24. In addition, communication device 10 can also optionally communicate over a wireline connection with non-real-time device 12, real-time device 14 and non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, personal computer, laptop computer, or other device that performs one or more functions that include communication of voice and/or data via wireline connection 28 and/or the wireless communication path. In an embodiment of the present invention, the real-time and non-real-time devices 12, 14 16, 18, 20, 22 and 24 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes an integrated circuit, such as a combined voice, data and RF integrated circuit that includes one or more features or functions of the present invention. Such integrated circuits shall be described in greater detail in association with FIGS. 3-8 that follow.

Figure 2:
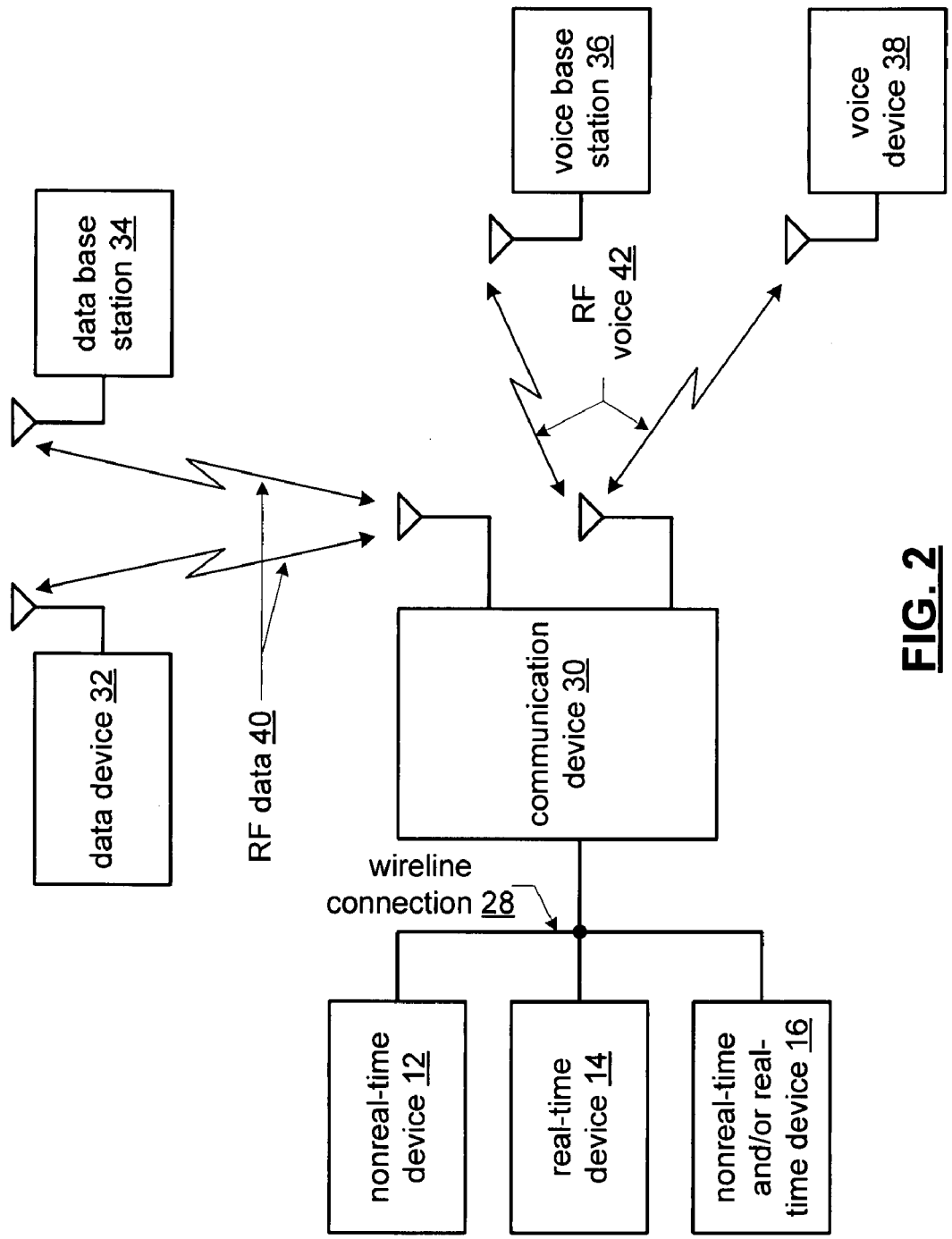
FIG. 2 is a schematic block diagram of a wireless communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes two separate wireless transceivers for communicating, contemporaneously, via two or more wireless communication protocols with data device 32 and/or data base station 34 via RF data 40 and voice base station 36 and/or voice device 38 via RF voice signals 42.

Figure 3:
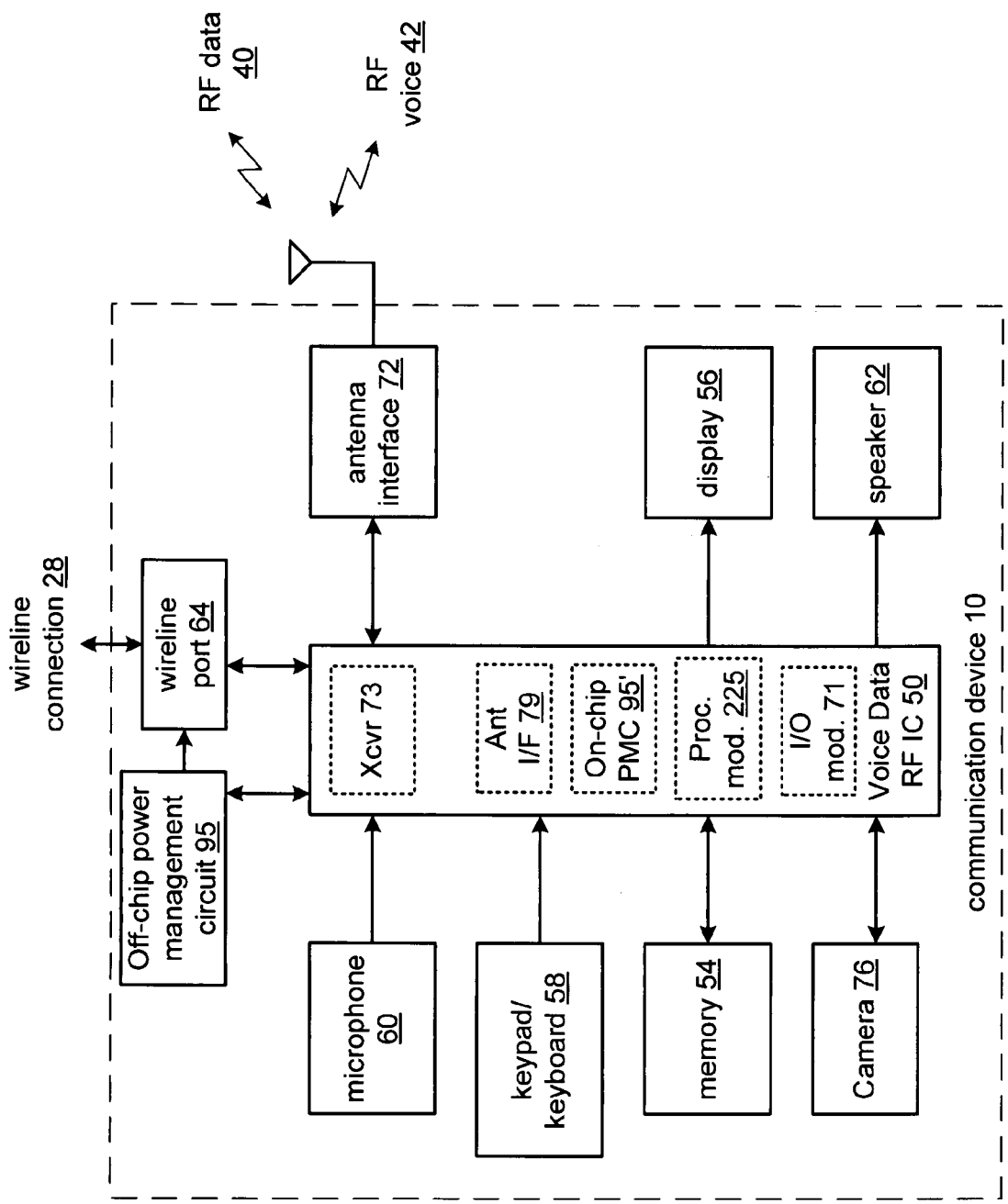
FIG. 3 is a schematic block diagram of a wireless communication device 10 in accordance with the present invention.

FIG. 3 is a schematic block diagram of an embodiment of an integrated circuit in accordance with the present invention. In particular, a voice data RF integrated circuit (IC) 50 is shown that implements communication device 10 in conjunction with microphone 60, keypad/keyboard 58, memory 54, speaker 62, display 56, camera 76, antenna interface 52 and wireline port 64. In addition, voice data RF IC 50 includes a transceiver 73 with RF and baseband modules for formatting and modulating data into RF real-time data 26 and non-real-time data 24 and transmitting this data via an antenna interface 72, optional on-chip antenna interface 79 and antenna. Further, voice data RF IC 50 includes an input/output module 71 with appropriate encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

Off-chip power management circuit 95 includes one or more DC-DC converters, voltage regulators, current regulators or other power supplies for supplying the voice data RF IC 50 and optionally the other components of communication device 10 and/or its peripheral devices with supply voltages and or currents (collectively power supply signals) that may be required to power these devices. Off-chip power management circuit 95 can operate from one or more batteries, line power and/or from other power sources, not shown. In particular, off-chip power management module can selectively supply power supply signals of different voltages, currents or current limits or with adjustable voltages, currents or current limits in response to power mode signals received from the voice data RF IC 50. Voice Data RF IC 50 optionally includes an on-chip power management circuit 95' for replacing the off-chip power management circuit 95.

In an embodiment of the present invention, the voice data RF IC 50 is a system on a chip integrated circuit that includes at least one processing device. Such a processing device, for instance, processing module 225, may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the Voice Data RF IC 50 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In operation, the voice data RF IC 50 executes operational instructions that implement one or more of the applications (real-time or non-real-time) attributed to communication devices 10 and 30 as discussed in conjunction with FIGS. 1 and 2. Further, RF IC 50 includes an on-chip transmit/receive switch in accordance with the present invention, as will be discussed in greater detail in association with the description that follows, and particularly in conjunction with FIGS. 5-8.

Figure 4:
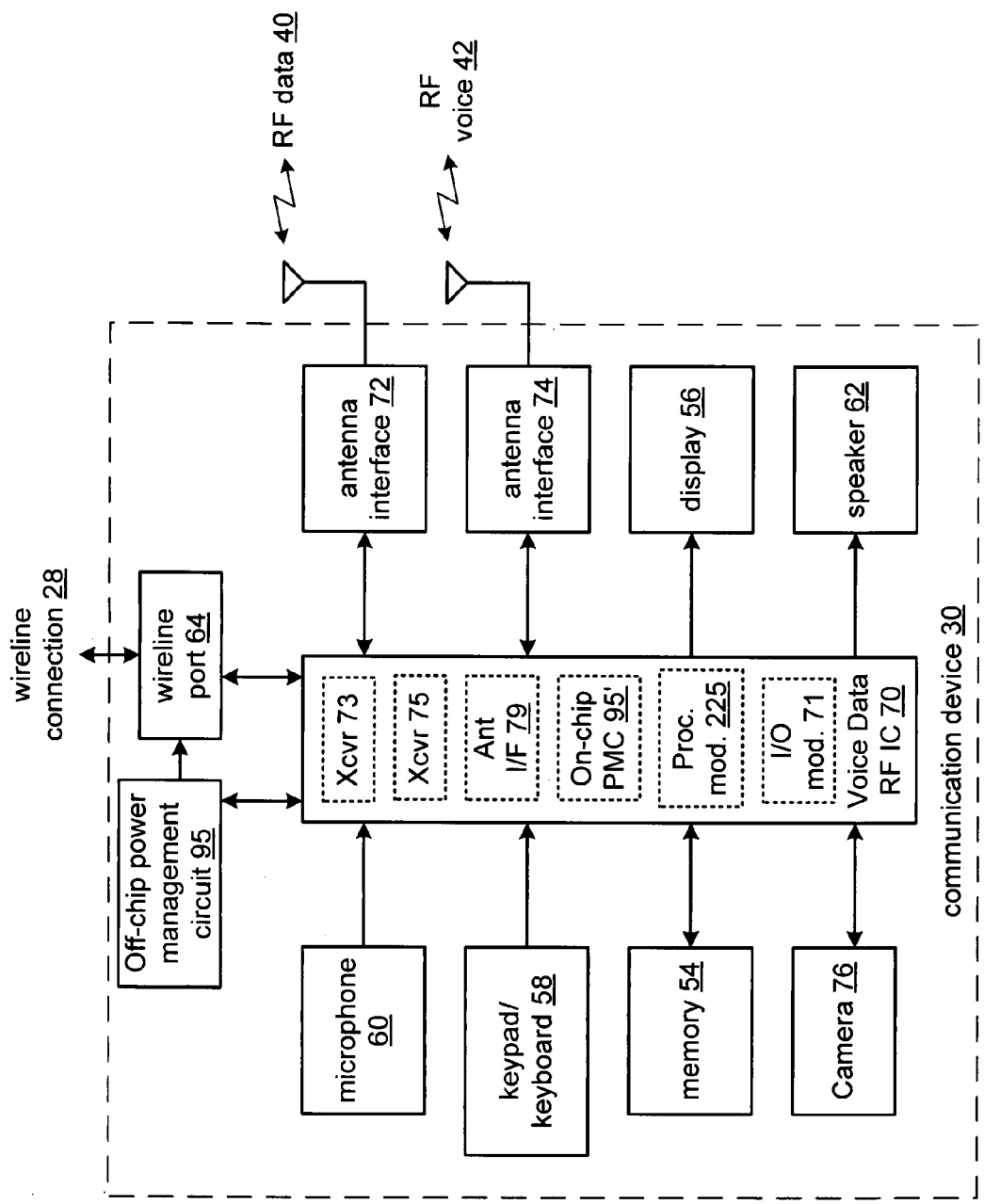
FIG. 4 is a schematic block diagram of a wireless communication device 30 in accordance with the present invention.

FIG. 4 is a schematic block diagram of another embodiment of an integrated circuit in accordance with the present invention. In particular, FIG. 4 presents a communication device 30 that includes many common elements of FIG. 3 that are referred to by common reference numerals. Voice data RF IC 70 is similar to voice data RF IC 50 and is capable of any of the applications, functions and features attributed to voice data RF IC 50 as discussed in conjunction with FIG. 3. However, voice data RF IC 70 includes two separate wireless 73 and 75 for communicating, contemporaneously, via two or more wireless communication protocols via RF data 40 and RF voice signals 42.

In operation, the voice data RF IC 70 executes operational instructions that implement one or more of the applications (real-time or non-real-time) attributed to communication device 10 as discussed in conjunction with FIG. 1. Further, RF IC 70 includes two on-chip transmit/receive switches corresponding to transceivers 73 and 75 in accordance with the present invention, as will be discussed in greater detail in association with the description that follows, and particularly in conjunction with FIGS. 5-8.

Figure 5:
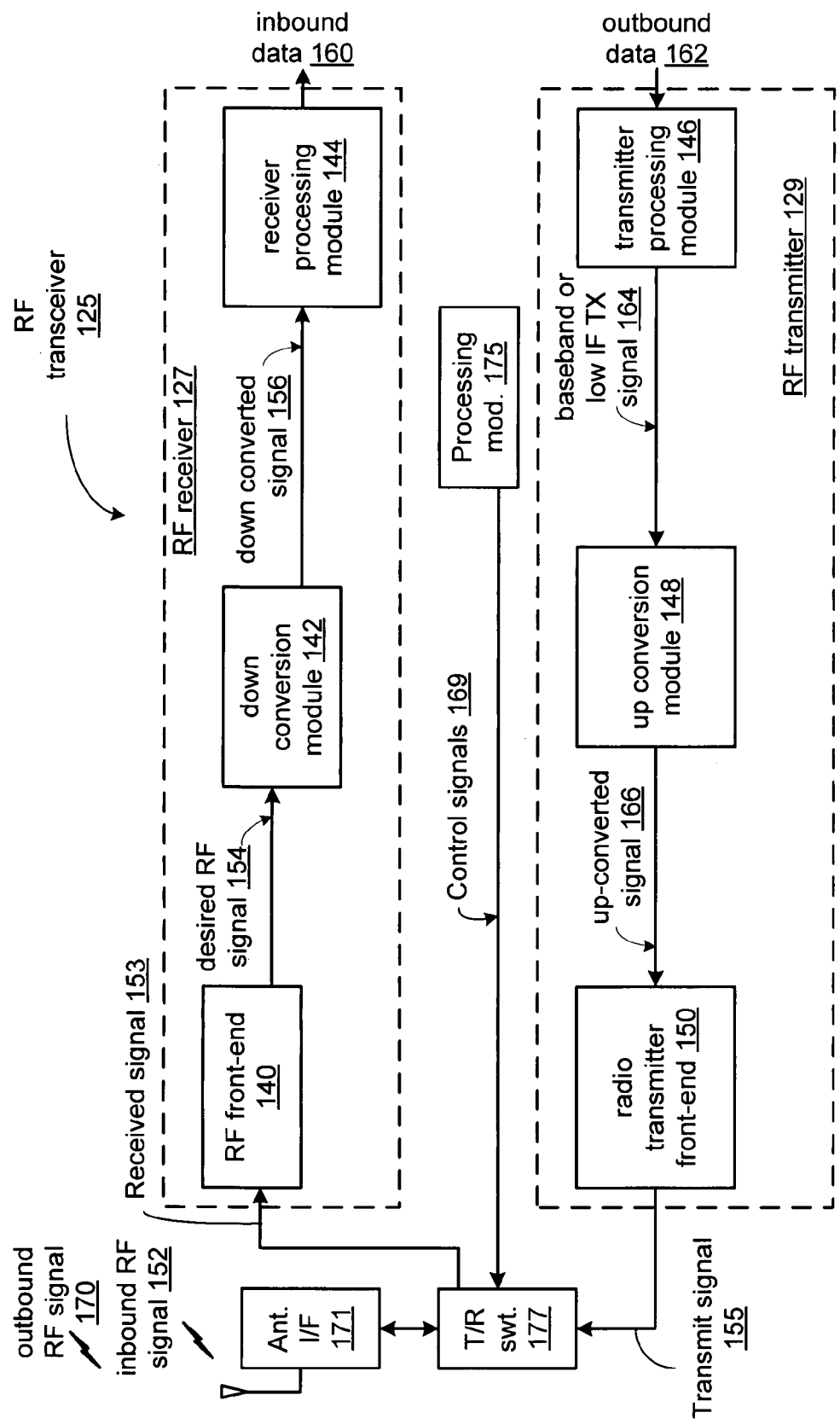
FIG. 5 is a schematic block diagram of an RF transceiver 125 in accordance with the present invention.

FIG. 5 is a schematic block diagram of an RF transceiver 125, such as transceiver 73 or 75, which may be incorporated in communication devices 10 and/or 30. The RF transceiver 125 includes an RF transmitter 129, an RF receiver 127 and a processing module 175. The RF receiver 127 includes a RF front end 140, a down conversion module 142, mismatch detection module 141 and a receiver processing module 144. The RF transmitter 129 includes a transmitter processing module 146, an up conversion module 148, and a radio transmitter front-end 150.

As shown, the receiver and transmitter are each coupled to an antenna through an off-chip antenna interface 171 and an on-chip reansmit/receive switch 177, that couples the transmit signal 155 to the antenna to produce outbound RF signal 170 and couples inbound signal 152 to produce received signal 153. A processing module 175, such as processing module 225, generates a control signal 169 to select either a receive mode or a transmit mode for the RF transmitter 129 and the RF receiver 127. The control signal 169 can be an analog signal or a digital signal that has a first value when the receive mode is selected and a second value when the transmit mode is selected. The transmit/receive switch 177 includes a first on-chip microelectromechanical switch that, when closed, provides a direct conductive path by moving a conductive element such as cantilevered beam, spring mounted conductor or other conductor in contact with a conductive pad to complete the circuit. This on-chip microelectromechanical switch is formed on the voice, data and RF IC 50 or 70 using a microelectromechanical systems (MEMS) technology, such as dry etching, wet etching or electro discharge machining, to create a feely moving conductive element as part of the switch. The reansmit/receive switch 177 is a single pole double throw (SPDT) switch that switches in response to the control voltage, such as the control signal 169. The physical dimensions of the conductive element of the transmit/receive switch can be chosen to carry the current necessary to support the RF transmitter 129. This current can be as much as 1 amp or more, based on the application.

In operation, the reansmit/receive switch 177 couples the transmit signal 155 to the antenna when the control signal 169 has a second value corresponding to transmit mode, and passes the received signal 153 to the RF front end 140 in response to the inbound RF signal 152 when the control signal 169 has a first value corresponding to receive mode. In an embodiment wherein the voice, data and RF IC 70 includes two transceivers 73 and 75, two reansmit/receive switches can be similarly employed and be separately switched based on the generation of two separate control signals 169 by the processing module 175.

While a single antenna is represented, the receiver and transmitter may share a multiple antenna structure that includes two or more antennas. In another embodiment, the receiver and transmitter may share a multiple input multiple output (MIMO) antenna structure that includes a plurality of antennas. Each of these antennas may be fixed, programmable, and antenna array or other antenna configuration. Also, the antenna structure of the wireless transceiver may depend on the particular standard(s) to which the wireless transceiver is compliant and the applications thereof.

In operation, the transmitter receives outbound data 162 from a host device or other source via the transmitter processing module 146. The transmitter processing module 146 processes the outbound data 162 in accordance with a particular wireless communication standard (e.g., IEEE 802.11, Bluetooth, RFID, GSM, CDMA, et cetera) to produce baseband or low intermediate frequency (IF) transmit (TX) signals 164. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 includes, but is not limited to, scrambling, encoding, puncturing, mapping, modulation, and/or digital baseband to IF conversion. Further note that the transmitter processing module 146 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up converted signals 166 based on a transmitter local oscillation 168.

The radio transmitter front end 150 includes a power amplifier and may also include a transmit filter module. The power amplifier amplifies the up converted signals 166 to produce outbound RF signals 170, which may be filtered by the transmitter filter module, if included. The antenna structure transmits the outbound RF signals 170 to a targeted device such as a RF tag, base station, an access point and/or another wireless communication device via an antenna interface 171 coupled to an antenna that provides impedance matching and optional bandpass or notch filtration.

The receiver receives inbound RF signals 152 via the antenna and off-chip antenna interface 171 that operates to process the inbound RF signal 152 into received signal 153 for the receiver front-end 140. In general, antenna interface 171 provides impedance matching of antenna to the RF front-end 140 and optional bandpass filtration of the inbound RF signal 152.

The down conversion module 70 includes a mixing section, an analog to digital conversion (ADC) module, and may also include a filtering and/or gain module. The mixing section converts the desired RF signal 154 into a down converted signal 156 that is based on a receiver local oscillation 158, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144 includes, but is not limited to, digital intermediate frequency to baseband conversion, demodulation, demapping, depuncturing, decoding, and/or descrambling. Note that the receiver processing modules 144 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the receiver processing module 144 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In an embodiment of the present invention, processing module 175 performs various processing steps to implement the functions and features described herein. Such a processing module can be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 175 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 6:
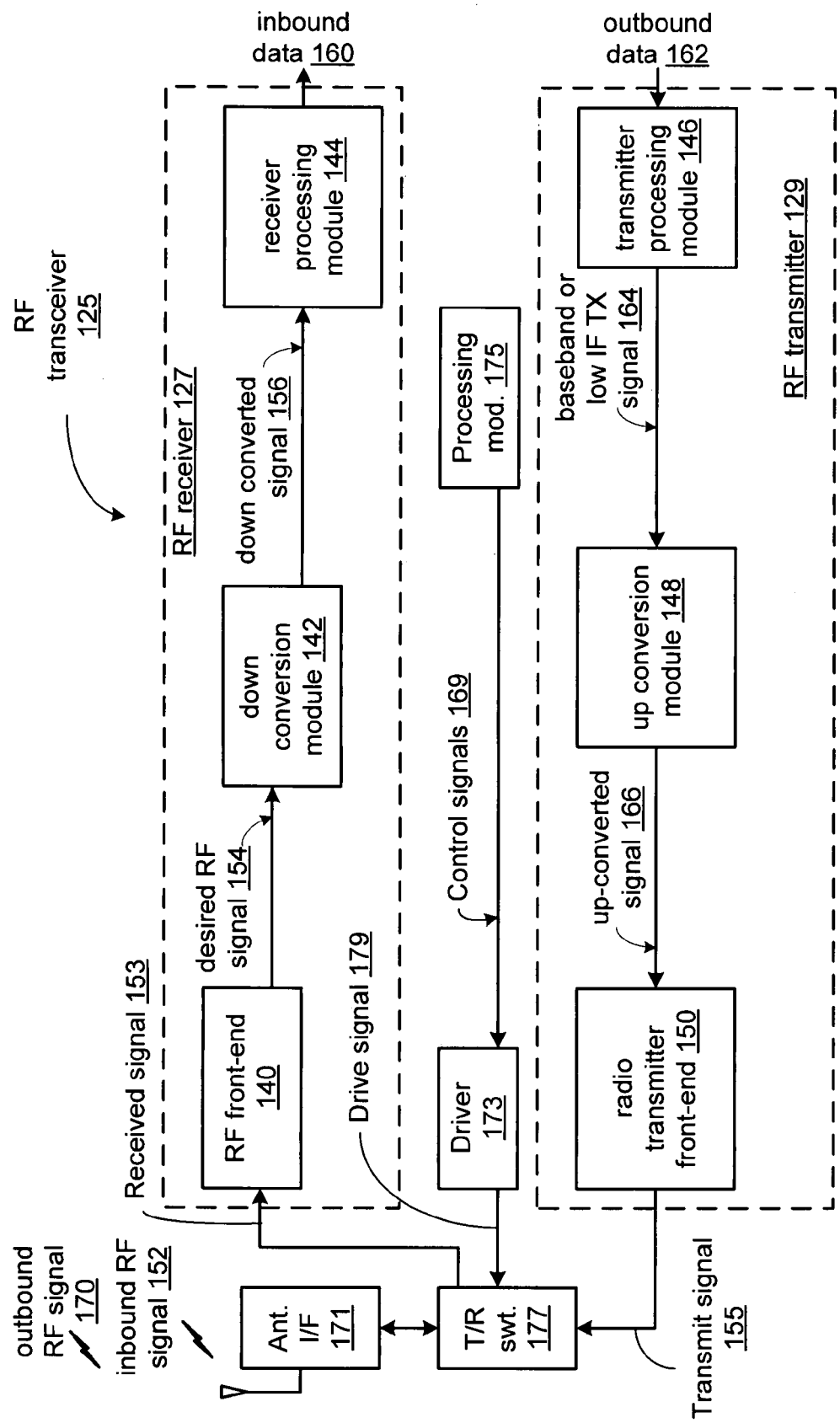
FIG. 6 is a schematic block diagram of an RF transceiver 125 in accordance with a further embodiment of the present invention.

FIG. 6 is a schematic block diagram of an RF transceiver 125 in accordance with a further embodiment of the present invention. This embodiment is similar to the embodiment presented in conjunction with FIG. 5 with similar elements being referred to by common reference numerals. In this embodiment however, processing module 175 generates control signals 169 that are converted to drive signal 179 by driver 173. In particular, driver 173 provides the voltage, current and/or other signaling required to control the transmit/receive switch 177. In this fashion, the drive signal 179 has a first value corresponding to the first value of the control signal 169 that commands the transmit/receive switch 177 to a first position. Further, the drive signal 179 has a second value corresponding to the second value of the control signal 169 that commands the transmit/receive switch 177 to a second position.

FIG. 7 is a flowchart representation of a method in accordance with an embodiment of the present invention. In particular a method is presented for use with one or more features or functions presented in conjunction with FIGS. 1-6. In step 400, a first transmit signal is generated from first outbound data. In step 402, first inbound data is generated from a first received signal. In step 404, a first control signal is generated to select one of, a receive mode and a transmit mode for a first RF transmitter and a first RF receiver, the first control signal having a first value when the receive mode is selected and a second value when the transmit mode is selected. In step 406, the first transmit signal is coupled to a first antenna with a first on-chip microelectromechanical switch when the first control signal has the second value. In step 408, a first inbound RF signal is coupled from the first antenna as the first received signal with the first on-chip microelectromechanical switch when the first control signal has the first value.

In an embodiment of the present invention the first outbound data includes voice communications in a voice mode of operation and the first outbound data includes non-realtime data in a data mode of operation.

FIG. 8 is a flowchart representation of a method in accordance with an embodiment of the present invention. In particular a method is presented for use with one or more features or functions presented in conjunction with the method of FIG. 7. In step 410, a second transmit signal is generated from second outbound data. In step 412, second inbound data is generated from a second received signal. In step 414, a second control signal is generated to select one of a receive mode or a transmit mode for the second RF transmitter and the second RF receiver, the second control signal having a first value when the receive mode is selected and a second value when the transmit mode is selected. In step 416, the second transmit signal is coupled to a second antenna with a second on-chip microelectromechanical switch when the second control signal has the second value. In step 418, a second inbound RF signal is coupled from the second antenna as the second received signal with the second on-chip microelectromechanical switch when the second control signal has the first value.

In an embodiment of the present invention, the first outbound data includes voice communications and the second outbound data includes non-realtime data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors discussed above may be field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A voice, data and RF integrated circuit (IC) comprising:
  a first RF transmitter that generates a first transmit signal from first outbound data;
  a first RF receiver that generates first inbound data from a first received signal;
  a second RF transmitter that generates a second transmit signal from second outbound data;
  a second RF receiver that generates second inbound data from a second received signal;
  a processing module, that generates a first control signal to select either a receive mode or a transmit mode for the first RF transmitter and the first RF receiver, the first control signal having a first value when the receive mode is selected and a second value when the transmit mode is selected and that generates a second control signal to select either a receive mode or a transmit mode for the second RF transmitter and the second RF receiver, the second control signal having a first value when the receive mode is selected and a second value when the transmit mode is selected;
  a first transmit/receive switch, coupled to the first RF transmitter, the first RF receiver and the processing module, that couples the first transmit signal to a first antenna when the first control signal has a second value, and that produces the first received signal based on a first inbound RF signal to the first antenna when the first control signal has a first value, wherein the first transmit/receive switch includes a first on-chip microelectromechanical switch; and
  a second transmit/receive switch, coupled to the second RF transmitter, the second RF receiver and the processing module, that couples the second transmit signal to a second antenna when the second control signal has a second value, and that produces the second received signal based on a second inbound RF signal to the second antenna when the second control signal has a first value, wherein the second transmit/receive switch includes a second on-chip microelectromechanical switch.

2. The voice, data and RF IC of claim 1 wherein the first outbound data includes voice communications in a voice mode of operation and the first outbound data includes non-realtime data in a data mode of operation.

3. The voice, data and RF IC of claim 1 wherein the first outbound data includes voice communications and the second outbound data includes non-realtime data.

4. A voice, data and RF integrated circuit (IC) comprising:
  a first RF transmitter that generates a first transmit signal from first outbound data;
  a first RF receiver that generates first inbound data from a first received signal;

a second RF transmitter that generates a second transmit signal from second outbound data;

a second RF receiver that generates second inbound data from a second received signal;

a processing module, that generates a first control signal to select either a receive mode or a transmit mode for the first RF transmitter and the first RF receiver, the first control signal having a first value when the receive mode is selected and a second value when the transmit mode is selected and that generates a second control signal to select either a receive mode or a transmit mode for the second RF transmitter and the second RF receiver, the second control signal having a first value when the receive mode is selected and a second value when the transmit mode is selected;

a first driver, coupled to the processing module that produces a first drive signal having first value in response to a first value of the first control signal, and that produces the first drive signal having a second value in response to a second value of the first control signal; and a first transmit/receive switch, coupled to the first RF transmitter, the first RF receiver and the processing module, that couples the first transmit signal to a first antenna when the first drive signal has a second value, and that produces the first received signal based on a first inbound RF signal to the first antenna when the first drive signal has a first value, wherein the first transmit/receive switch includes a first on-chip microelectromechanical switch;

a second driver, coupled to the processing module that produces a second drive signal having first value in response to a first value of the second control signal, and that produces the second drive signal having a second value in response to a second value of the second control signal; and a second transmit/receive switch, coupled to the second RF transmitter, the second RF receiver and the processing module, that couples the second transmit signal to a second antenna when the second drive signal has a second value, and that produces the second received signal based on a second inbound RF signal to the second antenna when the second drive signal has a first value, wherein the second transmit/receive switch includes a second on-chip microelectromechanical switch.

5. The voice, data and RF IC of claim 4 wherein the first outbound data includes voice communications in a voice mode of operation and the first outbound data includes non-realtime data in a data mode of operation.

6. The voice, data and RF IC of claim 4 wherein the first outbound data includes voice communications and the second outbound data includes non-realtime data.

7. A method for use in a voice, data and RF integrated circuit (IC), the method comprising:

generating a first transmit signal from first outbound data;

generating first inbound data from a first received signal;

generating a first control signal to select one of, a receive mode and a transmit mode for a first RF transmitter and a first RF receiver, the first control signal having a first value when the receive mode is selected and a second value when the transmit mode is selected; and coupling the first transmit signal to a first antenna with a first on-chip microelectromechanical switch when the first control signal has the second value; and coupling a first inbound RF signal from the first antenna as the first received signal with the first on-chip microelectromechanical switch when the first control signal has the first value;

generating a second transmit signal from second outbound data;

generating second inbound data from a second received signal;

generating a second control signal to select one of a receive mode or a transmit mode for the second RF transmitter and the second RF receiver, the second control signal having a first value when the receive mode is selected and a second value when the transmit mode is selected; and coupling the second transmit signal to a second antenna with a second on-chip microelectromechanical switch when the second control signal has the second value; and coupling a second inbound RF signal from the second antenna as the second received signal with the second on-chip microelectromechanical switch when the second control signal has the first value.

8. The method of claim 7 wherein the first outbound data includes voice communications in a voice mode of operation and the first outbound data includes non-realtime data in a data mode of operation.

9. The method of claim 7 wherein the first outbound data includes voice communications and the second outbound data includes non-realtime data.

* * * * *